Sept. 24, 1963   R. H. CRAMER ETAL   3,105,053
PROCESS FOR PREPARING ALUMINA HYDROSOL AND GEL
Filed Feb. 21, 1955
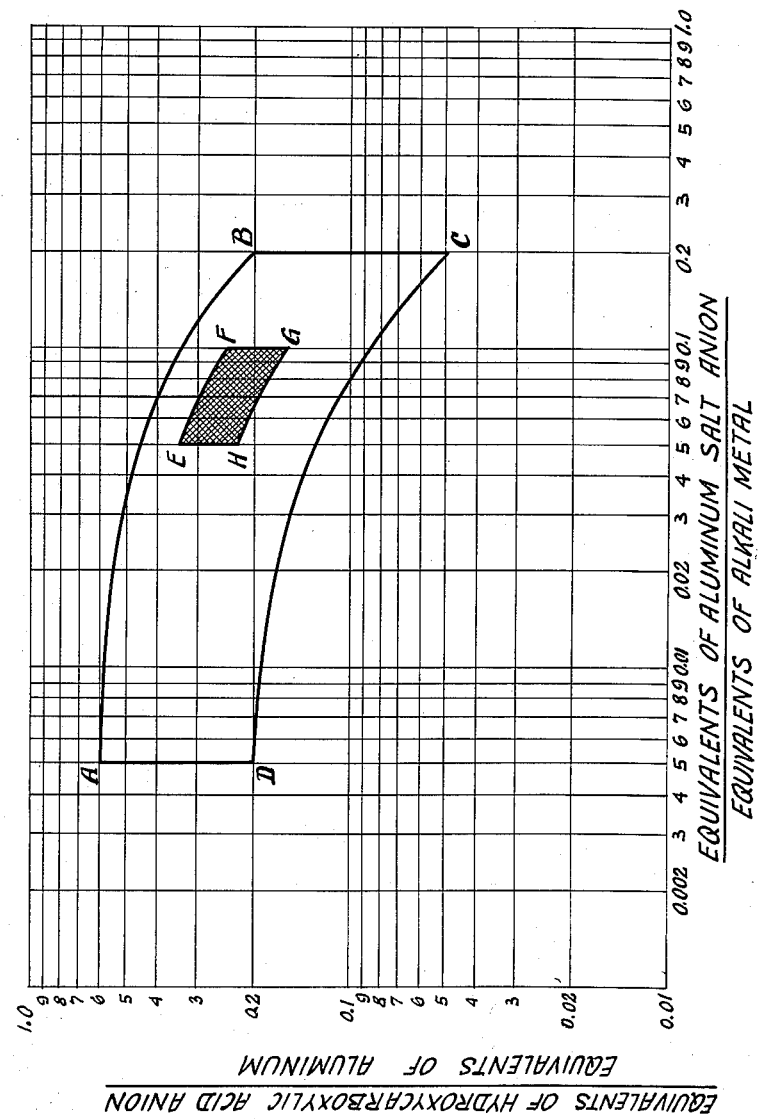
INVENTORS
Robert H. Cramer
Albert B. Schwartz
BY
Raymond W. Barclay
ATTORNEY 3,105,053
PROCESS FOR PREPARING ALUMINA
HYDROSOL AND GEL
Robert H. Cramer, Woodbury, N.J., and Albert B. Schwartz, Philadelphia, Pa., assignors to Socony Mobil Oil Company, Inc., a corporation of New York
Filed Feb. 21, 1955, Ser. No. 489,482
8 Claims. (Cl. 252—313)

This invention relates to an improved process for the formation of porous adsorptive inorganic oxide gels. More particularly, the present invention is concerned with the preparation of hydrogels having a solids content consisting essentially of alumina. In particular, the invention is directed to the production of hydrosols and hydrogels characterized by a relatively high solids content of alumina, i.e., greater than about 5 percent by weight, which hydrogels can be subjected to subsequent wet processing operations without effecting appreciable disintegration thereof.

Various methods for producing alumina gels have heretofore been proposed. In many of the previously suggested processes for manufacturing alumina gels, extensive washing of the hydrogel is required to remove impurities in order that the final gel product will have the desired properties. Such extensive washing has been detrimental to the yield of product since a considerable amount of hydrogel ordinarily undergoes disintegration during such step. Other processes have been developed in which alumina sols are produced directly and which do not require washing of the hydrogel. Such processes include those involving reaction of water with amalgamated aluminum metal in the presence of an organic acid such as acetic acid, formic acid, and the like. In these processes, however, it is found that the solids content of the sol is so low that considerable concentration must be effected. This increases the cost of production. Thus, alumina sols containing more than about 5 percent total solids have not been prepared commercially by the foregoing methods and as a practical matter a content of about 4 percent of hydrated alumina is about the highest that can be used. Therefore, this method of preparation is not well adapted for large scale manufacture of alumina gels, since it requires the handling of extremely large quantities of dilute solutions and the drying of hydrogels of low solids content. Furthermore, this method has the disadvantages of excessive foaming and the resulting alumina hydrosol is very often contaminated by the presence of entrained metallic mercury due to peptization of the amalgamated aluminum. In addition, such hydrosols and the corresponding hydrogels produced therefrom, possessing a comparatively low solids content, have not been suitable for the production of bead-like spheroidal gel particles by well known methods involving introduction of a hydrosol in the form of globules into a water-immiscible medium in which the sol globules set to hydrogel beads.

One of the principal objects of the present invention is the provision of a process for preparing alumina hydrogels of higher solids content, if desired, which hydrogels can be washed or otherwise subjected to wet processing, i.e., contacted with aqueous media, without undergoing appreciable disintegration. Another object of the invention is to afford a method for producing alumina hydrosols and hydrogels having a solids content greater than about 5 percent by weight. A still further object is the production of quick setting alumina hydrosols capable of being manufactured into hard alumina gel spheroids in accordance with the above-noted well known methods.

The above and other objects which will be apparent to those skilled in the art are achieved in accordance with the present invention wherein alumina hydrogels are prepared by intimately admixing solutions of an alkali metal aluminate, a hydroxy-carboxylic acid or salt thereof, and an inorganic water-soluble salt containing aluminum as the cation in controlled quantities to yield an alumina sol which sets to an all-embracing alumina hydrogel.

It is emphasized that the present process is directed to a method for preparing hydrogels as distinguished from gelatinous precipitates. It has heretofore been taught that the presence of electrolyte salts in the desired alumina hydrogel forming mixture has the detrimental effect of coagulating the aluminum ions in the form of an irreversible gelatinous precipitate and not in the form of a true hydrogel. The gelatinous precipitates so produced are incapable of being formed into desired spheroidal particles by introduction thereof in a water-immiscible liquid in accordance with procedures well known in the art and further have disadvantages of being structurally weak as compared with true hydrogels and of generally possessing a heterogeneous structure in comparison with the homogeneous structure achieved with true hydrogel formation. In accordance with the present invention, it has now been discovered that the presence in the hydrogel forming mixture of an electrolyte salt of aluminum under the conditions hereinafter set forth does not serve to coagulate the reactants in the form of a gelatinous precipitate as would be expected from the prior art teachings but, on the contrary, affords the formation of an alumina hydrogel which can be subjected to extensive washing with distinctly less disintegration than a corresponding alumina hydrogel prepared in the absence of such aluminum electrolyte salt.

The present invention thus contemplates an improved method for preparing hydrogels comprising alumina which, when dried, yield porous adsorptive alumina-containing gels. In order to produce alumina hydrogels having a high solids content and capable of being subjected to subsequent wet processing operations without undergoing disintegration, it has been discovered that certain critical conditions must be observed during formation. It has been found that a stable alumina hydrogel having a short time of set and a high solids content may readily be prepared by mixing solutions of an alkali metal aluminate, a hydroxycarboxylic acid or salt thereof, and an inorganic water-soluble salt containing aluminum as the cation and controlling the ratio equivalents of the aluminum salt anion to alkali metal and the ratio equivalents of hydroxycarboxylic acid anion to total aluminum in the reaction mixture. Generally, hydrogels prepared by the process described herein are characterized by a gelation time of not more than 2 hours and a solids content of between about 5 and about 30 percent by weight, although it is to be realized that hydrogels having a longer time of set and a lesser solids content, when desired, may also be produced by the present method. The method of this invention is particularly suitable for the production of hydrogels characterized by a time of set in the range of 0.5 to 300 seconds.

The particular ratio equivalents above-described contained in the reaction mixture will depend upon the exact nature of the alumina hydrogel desired. These ratio equivalents may be readily ascertained by those skilled in the art following the principles of this invention. Temperature, pH and solids content are interrelated variables effecting gelation and within the limits in which formation of hydrogels occurs, they control gelation time. In general, the other factors can be controlled to achieve gelation at any practical solution temperature. The pH of the hydrogel should generally be maintained on the alkaline side, i.e., above about 7. In particular, it is preferred that the pH of the hydrogel be within the approximate range of 10.5 to 12.5.

As the alkali metal aluminate reactant, preferably sodium aluminate, is employed, although it will be realized that other aluminates of the alkali metals may also be effectively used. An aqueous solution of the alkali metal aluminate is preferably used. It is generally desirable to add to the solution a small amount of the corresponding alkali metal hydroxide to stabilize the aluminate solution. Representative but non-limiting examples of the hydroxycarboxylic acids employed are glycolic, lactic, citric, tartaric, gluconic, malic, β-hydroxy butyric, β-hydroxy propionic, glyceric, and salicylic acids. It is preferred to employ an acid in which the hydroxy group is not more than two carbon atoms removed from the carboxyl group. Thus, in the case of aliphatic acids, alpha and beta hydroxycarboxylic acids are preferred. In the case of cyclic or aromatic acids, ortho hydroxycarboxylic acids are preferred. Salts of the foregoing acids may also be employed, particularly alkali metal and ammonium salts, it being understood that it is essential in accordance with the instant process that a hydroxycarboxylic acid anion be present in the hydrosol-forming mixture and that such anion may be introduced from the acid or from salts thereof.

The aluminum salt employed is an inorganic water-soluble salt containing aluminum as the cation. Generally, an aluminum mineral acid salt will be employed, such as aluminum nitrate, aluminum sulfate, aluminum chloride, basic aluminum chloride, etc. It is also contemplated that water-soluble salts of metals other than aluminum may be employed where it is desired to obtain a cogelled product of alumina and one or more other metal oxides. Thus, in place of an inorganic water-soluble salt containing aluminum as the cation, salts of various other metals may be employed, such as those of chromium, cobalt, molybdenum, iron, nickel, silver, tungsten, platinum, palladium, rhodium, vanadium, and manganese.

The foregoing reactant solutions are intimately admixed in any desired manner to yield a resulting hydrosol. Thus, the inorganic aluminum salt may be initially added in whole or part so that no precipitation is effected to either the hydroxycarboxylic acid solution or the alkali metal aluminate solution prior to mixing the two latter solutions. The solutions may be intimately admixed by flowing streams thereof together under conditions of rapid flow such as in a mixing nozzle. The reactants may be in the form of three individual streams or, after initially adding the inorganic aluminum salt to one reactant solution, the latter may be mixed with the other reactant solution.

It has been found, in accordance with the instant invention, that a stable alumina hydrogel can be produced by controlling the ratio of equivalents of the aluminum salt anion to alkali metal and the ratio of equivalents of hydroxycarboxylic acid anion to aluminum contained in the hydrosol forming solutions. The accompanying drawing presents data graphically illustrating relationships between the ratio equivalents of aluminum salt anion to alkali metal and the ratio equivalents of hydroxycarboxylic acid anion to aluminum satisfactory for the formation of alumina hydrogels.

Referring more particularly to the drawing, it will be seen that the ratio of equivalents of aluminum salt anion to equivalents of alkali metal is desirably between about 0.005 and about 0.2 and the ratio of equivalents of hydroxycarboxylic acid anion to equivalents of aluminum is within the area ABCD. Preferably, the ratio of equivalents of aluminum salt anion to equivalents of alkali metal is between about 0.05 and about 0.1 and the ratio of equivalents of hydroxycarboxylic acid anion to equivalents of aluminum is within the area EFGH. It has been found that alumina hydrogels having the latter equivalent ratio characteristics are particularly resistant to disintegration upon washing or otherwise wet processing.

The hydrogel may be allowed to set in the form of a mass which is thereafter broken or cut up into particles for wet processing. An alternate method of preparing alumina hydrogel particles is to drop the hydrosol in the form of globules into a column of water-immiscible liquid so that spheroidal bead-like particles of hydrogel are formed upon gelation of the hydrosol globules while maintained in the liquid.

The particles of hydrogel, after formation, are suitably, but not necessarily, aged in a water-immiscible media such as oil at an elevated temperature above about 100° F. for between about 1 and about 48 hours. Alumina hydrogel formed in accordance with the above-described method is generally subject to a loss of aluminum as alkali metal aluminate if immediately washed with water. This tends to weaken the hydrogel to such an extent that it becomes susceptible to disintegration in the wash water. Such adverse effect can be avoided by treating the freshly formed alumina hydrogel with an ammonium salt solution. Suitable representative ammonium salts include ammonium chloride, ammonium sulfate, ammonium nitrate, and ammonium acetate. Thus, in a typical operation, the fresh alumina hydrogel, either with or without the aforementioned oil treatment, is contacted with a 20 percent by weight solution of ammonium sulfate. The pH of the solution is suitably greater than 4 and preferably in the range of 6 to 10. During contact of the hydrogel and ammonium sulfate solution, the alkali metal contained in the hydrogel is removed therefrom by base exchange and the alumina becomes fixed. If the pH is higher than 10, the alkali metal becomes more difficult to remove. On the other hand, if the pH is less than 4, the soluble anions become more difficult to wash out. It has been found advisable to maintain a solution of the aforementioned pH range in contact with the freshly formed alumina hydrogel for some time after formation. For example, the solution is suitably recirculated through the fresh hydrogel for 2 to 48 hours after forming in order to fix the alumina.

The hydrogel may thereafter be washed with water or water containing a small amount of electrolyte to prevent the alumina from peptizing. If the salt used for treating decomposes upon heating, the hydrogel may be partially washed to remove soluble ions which do not decompose upon heating and the remainder of the impurities removed by tempering.

Thus, the alkali metal ion from the aluminate solution may be replaced by treating in a concentrated salt solution. Additional components may be introduced into the gel by ion exchange during this step. The salt may be one which decomposes upon heating, such as $NH_4NO_3$, or a salt such as $(NH_4)_2SO_4$ which introduces a non-metallic ion which can be washed out or removed upon heating or a polyvalent metal salt which will introduce a metal ion into the gel structure. Also, additional components may be introduced into the hydrogel during the base exchange operation. Likewise, additional components may be introduced by impregnation during the hydrogel stage or by impregnation of the dried and/or calcined gel. Additional components, when desired, may further be introduced by dissolving in one or more of the hydrosol forming solutions or by dispersing in the already formed hydrosol. Also, anions such as silicate may be introduced by dissolving in the alkaline reactant solution, i.e., the alkali metal aluminate solution, or in the form of an individual reactant stream.

The washed hydrogel can be satisfactorily dried in either superheated steam or heated air. The hydrogel so dried may thereafter be calcined at an elevated temperature generally within the approximate range of 350° to 1400° F. The particular temperature chosen for calcination will depend, in part, on the use to be made of the finished gel. Thus, where the gel is to be employed as an adsorbent, it is calcined at a temperature in the approximate range of 350° F. to 800° F. If, on the other hand, the gel is to be used as a catalyst or catalyst support, the temperature of calcination is generally between about 800° F. and about 1400° F.

The invention may be illustrated by the following non-limiting examples:

EXAMPLE 1

An alumina hydrogel was prepared from the following reactants.

Solution A: Sodium aluminate solution having a specific gravity at 60° F. of 1.394, containing by weight 25.9% sodium aluminate, 9.1% sodium hydroxide, and 65% water.
Solution B: Acid solution having a specific gravity at 60° F. of 1.224 and containing by weight 42.3% citric acid, 3.25% aluminum sulfate, and 54.45% water.

Solution A, flowing at a rate of 930 cc./min., was mixed in a nozzle with Solution B flowing at a rate of 510 cc./min. The hydrosol so formed, having a concentration of 175 grams $Al_2O_3$ per liter was poured into a tray and set therein at a temperature of 135° F. to a hydrogel in 2.3 seconds. The resulting hydrogel was hard and clear and had a pH of 11.7. The ratio of equivalents of sulfate to equivalents of sodium was 0.054 and the ratio of equivalents of citric acid to equivalents of aluminum was 0.256.

The hydrogel so obtained was cut into cubes and aged in a petroleum oil for 8 hours at 120° F. The aged hydrogel cubes were thereafter treated 18 times at 2-hour intervals with a 20 percent by weight aqueous solution of ammonium sulfate adjusted to a pH of 6 with ammonium hydroxide. The hydrogel was thereafter water-washed 20 times at 1-hour intervals to remove water-soluble impurities from the hydrogel. The hydrogel did not undergo any disintegration during the foregoing wet processing steps. The cubes were then dried in air at 100° F. for 15 hours and then calcined in air for 2 hours at 1000° F. The resulting gel had a surface area of 365 square meters per gram.

Examples 2 to 18, employing various aluminum salts and hydroxycarboxylic acids, carried out following the general procedure set forth in Example 1 above, are set forth in Table I below:

*Table I*

| Example Number | Forming | | | | | | | | | | | |
|---|---|---|---|---|---|---|---|---|---|---|---|---|
| | Sodium Aluminate Solution | | | | | Acid Solution | | | | | | |
| | NaAlO₂, percent Wt. | NaOH, percent Wt. | H₂O, percent Wt. | Sp. Gr. at 60° F. | Rate, cc./min. | Aluminum salt | | Acid | | H₂O, percent Wt. | Sp. Gr. at 60° F. | Rate, cc./min. |
| | | | | | | Type | Percent Wt. | Type | Percent Wt. | | | |
| 2 | 29.6 | 5.0 | 65.4 | 1.393 | 860 | Al₂(SO₄)₃ | 0.30 | Citric | 49.3 | 50.4 | 1.222 | 568 |
| 3 | 29.6 | 5.0 | 65.4 | 1.395 | 830 | Al₂(SO₄)₃ | 1.27 | ___do___ | 47.0 | 51.73 | 1.222 | 624 |
| 4 | 29.6 | 5.0 | 65.4 | 1.398 | 1,020 | Al₂(SO₄)₃ | 4.21 | ___do___ | 54.9 | 40.89 | 1.304 | 376 |
| 5 | 29.6 | 5.0 | 65.4 | 1.395 | 826 | Al₂(SO₄)₃ | 6.94 | ___do___ | 31.1 | 61.96 | 1.212 | 424 |
| 6 | 29.6 | 5.0 | 65.4 | 1.395 | 820 | Al₂(SO₄)₃ | 7.70 | ___do___ | 30.9 | 61.4 | 1.222 | 462 |
| 7 | 29.6 | 5.0 | 65.4 | 1.394 | 550 | Al₂(SO₄)₃ | 2.6 | Glycolic | 38.0 | 59.4 | 1.166 | 497 |
| 8 | 29.6 | 5.0 | 65.4 | 1.394 | 594 | Al₂(SO₄)₃ | 2.6 | Tartaric | 37.4 | 60.0 | 1.226 | 370 |
| 9 | 29.6 | 5.0 | 65.4 | 1.393 | 352 | Al₂(SO₄)₃ | 2.38 | Lactic | 37.62 | 60.0 | 1.117 | 403 |
| 10 | 29.6 | 5.0 | 65.4 | 1.396 | 562 | Al(NO₃)₃ | 2.6 | Citric | 49.4 | 48.0 | 1.250 | 478 |
| 11 | 29.6 | 5.0 | 65.4 | 1.396 | 562 | Al(NO₃)₃ | 4.7 | ___do___ | 47.7 | 47.6 | 1.265 | 373 |
| 12 | 29.6 | 5.0 | 65.4 | 1.396 | 568 | AlCl₃ | 2.0 | ___do___ | 38.0 | 60.0 | 1.185 | 500 |
| 13 | 29.6 | 5.0 | 65.4 | 1.394 | 570 | AlCl₃ | 2.4 | ___do___ | 37.6 | 60.0 | 1.188 | 505 |
| 14 | 29.6 | 5.0 | 65.4 | 1.394 | 560 | AlCl₃ | 3.8 | ___do___ | 36.2 | 60.0 | 1.195 | 385 |
| 15 | 29.6 | 5.0 | 65.4 | 1.394 | 545 | AlCl₃ | 7.0 | ___do___ | 33.0 | 60.0 | 1.215 | 330 |
| 16 | 29.6 | 5.0 | 65.4 | 1.394 | 570 | [Al₂(OH)₅Cl]ₙ | 8.0 | ___do___ | 32.0 | 60.0 | 1.194 | 437 |
| 17 | 29.6 | 5.0 | 65.4 | 1.396 | 544 | [Al₂(OH)₅Cl]ₙ | 18.2 | ___do___ | 21.8 | 60.0 | 1.217 | 427 |
| 18 | 29.6 | 5.0 | 65.4 | 1.393 | 490 | None | --- | ___do___ | 50.0 | 50.0 | 1.224 | 345 |

| Example Number | Hydrosol Properties | | | | | Processing | | | | | | |
|---|---|---|---|---|---|---|---|---|---|---|---|---|
| | Time, Sec. | Temp., ° F. | pH | g. Al₂O₃/liter Hydrosol | Equivalents of Hydroxycarboxylic Acid Anion/ Equiv. of Aluminum | Equivalents of Inorganic Anion/ Equiv. of Sodium | Treat in Oil | | Base Exchange in 20% Wt. (NH₄)₂SO₄ | | | Water Wash | |
| | | | | | | | Hrs. | Temp., ° F. | ph | Number of Times | Freq., hour | Number of Times | Freq., hour |
| 2 | --- | --- | --- | 160 | 0.366 | 0.007 | 8 | 120 | 10 | 12 | 2 | 20 | 1 |
| 3 | --- | --- | --- | 153 | 0.394 | 0.030 | 8 | 120 | 10 | 12 | 2 | 20 | 1 |
| 4 | <0.5 | --- | --- | 198 | 0.237 | 0.050 | --- | --- | --- | --- | --- | --- | --- |
| 5 | 4.0 | 127 | 10.9 | 183 | 0.170 | 0.108 | 24 | 120 | 7 | 12 | 2 | 20 | 1 |
| 6 | --- | --- | --- | 179 | 0.185 | 0.134 | --- | --- | --- | --- | --- | --- | --- |
| 7 | 2.0 | 152 | 11.8 | 143 | 0.330 | 0.068 | 8 | 120 | 6 | 18 | 2 | 20 | 1 |
| 8 | 300 | 142 | 11.7 | 166 | 0.344 | 0.050 | 8 | 120 | 6 | 18 | 2 | 20 | 1 |
| 9 | <0.5 | 120 | 11.2 | 127 | 0.335 | 0.076 | 8 | 120 | 7 | 12 | 2 | 20 | 1 |
| 10 | 0.5 | 190 | 10.8 | 146 | 0.475 | 0.056 | 8 | 120 | 10 | 12 | 2 | 20 | 1 |
| 11 | <0.5 | 190 | 12.0 | 165 | 0.356 | 0.080 | 8 | 120 | 10 | 12 | 2 | 20 | 1 |
| 12 | 2.3 | 160 | 11.8 | 145 | 0.356 | 0.068 | 8 | 120 | 10 | 12 | 2 | 20 | 1 |
| 13 | 1.6 | 151 | 11.4 | 145 | 0.359 | 0.082 | 8 | 120 | 6 | 18 | 2 | 20 | 1 |
| 14 | 1.0 | 137 | 11.7 | 164 | 0.262 | 0.100 | 8 | 120 | 10 | 12 | 2 | 20 | 1 |
| 15 | 3.2 | 137 | 11.7 | 177 | 0.208 | 0.167 | 8 | 120 | 10 | 12 | 2 | 20 | 1 |
| 16 | 1.5 | 125 | 12.0 | 174 | 0.260 | 0.060 | 8 | 120 | 6 | 18 | 2 | 20 | 1 |
| 17 | <0.5 | --- | 12.1 | 205 | 0.175 | 0.142 | 8 | 120 | 6 | 18 | 2 | 20 | 1 |
| 18 | 2.2 | 151 | 11.3 | 155 | 0.399 | 0 | 8 | 120 | 7 | 18 | 2 | 20 | 1 |

It will be seen from the above table that alumina gels may be prepared in accordance with the present procedure utilizing a sodium aluminate-citric acid-aluminum sulfate system at various aluminum sulfate concentrations, as illustrated by Examples 1 to 6. It will further be noted that alumina gels were formed with the sodium aluminate-aluminum sulfate system using citric acid (Examples 1 to 6), glycolic acid (Example 7), tartaric acid (Example 8) and lactic acid (Example 9). Alumina gels were also formed with the sodium aluminate-citric acid system using aluminum sulfate (Examples 1 to 6), aluminum nitrate (Examples 10 and 11), aluminum chloride (Examples 12 to 15), and basic aluminum chloride (Examples 16 and 17). In Example 18, the inorganic aluminum salt was omitted as a reactant and a major proportion of the hydrogel obtained in this example underwent disintegration upon wet processing, indicating that the presence of an inorganic aluminum salt in the reaction mixture is essential in obtaining a resulting alumina hydrogel which does not undergo appreciable disintegration upon extended contact thereof with aqueous media.

EXAMPLE 19

An alumina hydrogel was prepared from the following reactants.

Solution A: Sodium aluminate solution having a specific gravity at 60° F. of 1.396 and containing by weight 25.9% sodium aluminate, 9.1% sodium hydroxide, and 65% water.

Solution B: Acid solution having a specific gravity at 60° F. of 1.225 and containing by weight 42.3% citric acid, 3.25% of aluminum sulfate, and 54.45% water.

Solution A, flowing at a rate of 910 cc./min., was mixed with solution B, flowing at a rate of 520 cc./min., in an efficient mixing nozzle. The resulting stream of hydrosol was introduced in the form of globules into a column of D.T.E. light oil at a temperature of 143° F. The hydrosol set to beads of hydrogel at a pH of 12.0 and a temperature of 140° F. in 2.3 seconds, the resulting hydrogel beads were sluiced from the bottom of the forming tower with the forming oil. The bead hydrogel was treated for 24 hours in 20% weight ammonium sulfate solution adjusted to 7 pH with NH$_4$OH. After treating, the gel was washed until a sulfate-free wash water was indicated. The hydrogel beads did not undergo any disintegration during the aging or washing steps. The beads were thereafter dried in 100 percent steam at 235° F.–340° F. for 7.5 hours and then calcined 2 hours at 1000° F.

EXAMPLE 20

An alumina hydrogel was prepared from the following reactants.

Solution A: Sodium aluminate solution having a specific gravity at 60° F. of 1.394, containing by weight 25.9% sodium aluminate, 9.1% sodium hydroxide, and 65% water.

Solution B: Acid solution having a specific gravity at 60° F. of 1.224 and containing by weight 42.3% citric acid, 3.25% aluminum sulfate, and 54.45% water.

Solution A, flowing at a rate of 800 cc./min. was mixed in a nozzle with solution B, flowing at a rate of 510 cc./min. The hydrosol so formed was poured into a tray and set at a temperature of 138° F. to a hydrogel in 4 seconds. The resulting hydrogel was hard and clear and had a pH of 10.7. The ratio of equivalents of sulfate to equivalents of sodium was 0.062 and the ratio of equivalents of citric acid to aluminum was 0.256.

The hydrogel so obtained was cut into cubes and aged in a petroleum oil for 8 hours at 120° F. The aged hydrogel cubes were thereafter treated 12 times at 2-hour intervals with a 20 percent by weight aqueous solution of ammonium sulfate having a pH of 7. The hydrogel was thereafter water-washed 20 times at 1-hour intervals to remove water-soluble impurities from the hydrogel. The hydrogel did not undergo any appreciable disintegration during the foregoing wet processing steps. The cubes were then dried in air at 200° F. for 8 hours and then calcined 2 hours at 1000° F.

Examples 21 to 25 were identical with Example 20 except that the wet processing steps were carried out under different conditions as set forth in Table II below:

*Table II*

| Example Number | Treat in Oil | | Base Exchange in 20% Wt. (NH$_4$)$_2$SO$_4$ | | | Water Wash | |
|---|---|---|---|---|---|---|---|
| | Hrs. | Temp., °F. | pH | Number of Times | Freq., hours | Number of Times | Freq., hours |
| 21 | 24 | 120 | 7 | 12 | 2 | 20 | 1 |
| 22 | 8 | 120 | 10 | 12 | 2 | 20 | 1 |
| 23 | 24 | 120 | 10 | 12 | 2 | 20 | 1 |
| | Age in 20% Wt. (NH$_4$)$_2$SO$_4$ | | | | | | |
| 24 | 8 | Room | 7 | 12 | 2 | 20 | 1 |
| 25 | 8 | Room | 10 | 12 | 2 | 20 | 1 |

It is contemplated that the alumina gels produced in accordance with the process of this invention may be used as desiccants, adsorbents, treating, refining, or purifying agents, or as a catalyst support, catalyst or component of a catalyst for the conversion of organic compounds and particularly the conversion of hydrocarbons. Thus, an alkali metal-free alumina is of particular value in the manufacture of petroleum cracking catalyst and petroleum hydroforming catalyst. In the manufacture of impregnated alumina hydroforming catalysts, it is common practice to include in the alumina gel one or more polyvalent metal oxides, usually an oxide of the 5th, 6th, and 8th groups of the periodic system. Thus, for example, a hydroforming catalyst may be prepared by incorporating a minor proportion, for example, 2–15 percent by weight, of molybdenum oxide on the washed alumina hydrogel prior to drying and calcining thereof. Chromium oxide in amounts ranging from about 2 percent to about 30 percent of the finished catalyst may also be used. Other oxides, such as those of tungsten, vanadium, platinum, palladium, osmium, iridium, ruthenium, or rhodium, may be employed. Also, the alumina gel may be combined with cobalt molybdate or two or more metal oxides, for example, chromia and molybdena. Any one or more of these or other similar metal oxides can be incorporated in the hydrosol, hydrogel, or impregnated on the finished alumina gel. Such catalysts are particularly valuable in the form of hard, glassy spheroids since they are thereby rendered more resistant to abrasion and are hence well adapted to either static or moving bed type systems wherein the catalyst moves in a closed path including a reactor and a regenerator.

It is to be understood that the above description is merely illustrative of preferred embodiments of the invention, of which many variations may be made by those skilled in the art without departing from the spirit thereof.

We claim:

1. A process for preparing an alumina hydrosol, which comprises intimately admixing aqueous solutions of an alkali metal aluminate, a hydroxycarboxylic acid selected from the group consisting of citric, glycolic, tartaric and lactic acids and an inorganic water-soluble salt containing aluminum as the cation in such proportions that the ratio equivalents of aluminum salt anion to alkali metal is between about 0.005 and about 0.2 and the ratio equivalents of hydroxycarboxylic acid to aluminum is within the area ABCD of the accompanying drawing.

2. A method for preparing an alumina hydrogel, which comprises intimately admixing aqueous solutions of an alkali metal aluminate, a hydroxycarboxylic acid selected from the group consisting of citric, glycolic, tartaric and lactic acids and a water-soluble aluminum mineral acid salt in such proportions as to yield an alkaline hydrosol in which the ratio equivalents of aluminum salt anion to alkali metal is between about 0.005 and about 0.2 and the ratio equivalents of hydroxycarboxylic acid to aluminum is within the area ABCD of the accompanying figure, and thereafter maintaining the resulting hydrosol without addition to or subtraction from said sol of any substance until the same sets to a hydrogel.

3. A process for preparing an alumina hydrogel, which comprises intimately admixing aqueous solutions of an alkali metal aluminate, a hydroxycarboxylic acid selected from the group consisting of citric, glycolic, tartaric and lactic acids and an inorganic water-soluble salt containing aluminum as the cation in such proportions as to yield a hydrosol wherein the ratio equivalents of aluminum salt anion to alkali metal is between about 0.05 and about 0.1 and the ratio equivalents of hydroxycarboxylic acid to aluminum is within the area EFGH of the accompanying drawing, and thereafter maintaining the resulting hydrosol without addition to or subtraction from said sol of any substance until the same sets to a hydrogel.

4. A process for preparing an alumina gel, which comprises intimately admixing a water solution of an alkali metal aluminate, a water solution containing a hydroxycarboxylic acid selected from the group consisting of citric, glycolic, tartaric and lactic acids, and an inorganic water-soluble salt containing aluminum as the cation in such proportions as to yield an alkaline hydrosol having an alumina content of at least 5 percent by weight and in which the ratio equivalents of aluminum salt anion to alkali metal is between about 0.005 and about 0.2 and the ratio equivalents of hydroxycarboxylic acid anion to aluminum is within the area ABCD of the accompanying figure, maintaining the resulting hydrosol without addition to or subtraction from said sol of any substance until the same sets to a hydrogel, treating the resulting hydrogel with an ammonium salt solution having a pH in the approximate range of 4 to 10 for a period of at least 2 hours, washing the treated hydrogel free of water-soluble impurities, and thereafter drying.

5. A process for preparing alumina gel, which comprises intimately admixing aqueous solutions of an alkali metal aluminate, a hydroxycarboxylic acid selected from the group consisting of citric, glycolic, tartaric and lactic acids and an inorganic water-soluble salt containing aluminum as the cation to yield an alkaline hydrosol in which the ratio equivalents of aluminum salt anion to alkali metal is between about 0.005 and about 0.2 and the ratio equivalents of hydroxycarboxylic acid to aluminum is within the area ABCD of the accompanying figure, maintaining the resulting hydrosol without addition to or subtraction from said sol of any substance until the same sets to a hydrogel, treating the resulting hydrogel with an ammonium salt solution having a pH in the approximate range of 4 to 10 for a period of at least 2 hours, washing the treated hydrogel free of water-soluble impurities, and thereafter drying.

6. A process for preparing alumina gel, which comprises intimately admixing aqueous solutions of an alkali metal aluminate, a hydroxycarboxylic acid selected from the group consisting of citric, glycolic, tartaric and lactic acids and an inorganic water-soluble salt containing aluminum as the cation to yield an alkaline hydrosol in which the ratio equivalents of aluminum salt anion to alkali metal is between about 0.05 and about 0.1 and the ratio equivalents of hydroxycarboxylic acid to aluminum is within the area EFGH of the accompanying figure, maintaining the resulting hydrosol without addition to or subtraction from said sol of any substance until the same sets to a hydrogel, treating the resulting hydrogel with an ammonium salt solution having a pH in the approximate range of 4 to 10 for a period of at least 2 hours, washing the treated hydrogel free of water-soluble impurities, and thereafter drying.

7. A process for preparing an alumina hydrogel, which comprises forming an alumina hydrosol characterized by an inherent capacity to set to a hydrogel upon lapse of a suitable period of time by intimately admixing aqueous solutions of an alkali metal aluminate, an inorganic water-soluble salt containing aluminum as the cation, and a hydroxycarboxylic acid selected from the group consisting of citric, glycolic, tartaric and latic acids in such proportions that the ratio equivalents of aluminum salt anion to alkali metal is between about 0.005 and about 0.2 and the ratio equivalents of hydroxycarboxylic acid anion to aluminum is within the area ABCD of the accompanying figure and maintaining the resulting hydrosol without addition to or subtraction from said sol of any substance until the same sets to a hydrogel.

8. A process for preparing an alumina hydrogel, which comprises forming an alumina hydrosol having an alumina content of at least 5 percent by weight and capable of gelation to an alumina hydrogel in less than 2 hours by intimately admixing an aqueous solution of an alkali metal aluminate, an aqueous solution containing a hydroxycarboxylic acid selected from the group consisting of citric, glycolic, tartaric and lactic acids and an inorganic water-soluble salt containing aluminum as the cation in such proportions that the ratio equivalents of aluminum salt anion to alkali metal is between about 0.005 and about 0.2 and the ratio equivalents of hydroxycarboxylic acid anion to aluminum is within the area ABCD of the accompanying figure and maintaining the resulting hydrosol without addition to or subtraction from said sol of any substance until the same sets to a hydrogel.

References Cited in the file of this patent

UNITED STATES PATENTS

| | | |
|---|---|---|
| 2,085,129 | Stoewener | June 29, 1937 |
| 2,369,734 | Heard | Feb. 20, 1945 |
| 2,762,783 | Kimberlin et al. | Sept. 11, 1956 |
| 2,773,839 | Stover et al. | Dec. 11, 1956 |
| 2,773,845 | Stover et al. | Dec. 11, 1956 |